United States Patent [19]

Tanonaka

[11] Patent Number: 5,682,408
[45] Date of Patent: Oct. 28, 1997

[54] METHOD OF TRANSMITTING SYNC CLOCK AND SYNC DATA BETWEEN SHELVES OF A SYNCHRONOUS DIGITAL HIERARCHY SYSTEM

[75] Inventor: Kouji Tanonaka, Kawasaki, Japan

[73] Assignee: Fujitsu Limited, Kanagawa, Japan

[21] Appl. No.: 605,708

[22] Filed: Feb. 23, 1996

Related U.S. Application Data

[63] Continuation of Ser. No. 210,236, Mar. 17, 1994, abandoned.

[30] Foreign Application Priority Data

Sep. 20, 1993 [JP] Japan ................................ 5-233098

[51] Int. Cl.⁶ .................................................. H04L 7/00
[52] U.S. Cl. ........................................ 375/354; 375/356
[58] Field of Search ................................. 375/354, 355, 375/356; 340/825.14, 825.2; 370/110.1

[56] References Cited

U.S. PATENT DOCUMENTS

| | | | |
|---|---|---|---|
| 4,942,590 | 7/1990 | Terada | 375/119 |
| 5,321,728 | 6/1994 | Andrieu | 375/106 |
| 5,327,402 | 7/1994 | Shinomiya | 375/106 |

Primary Examiner—Stephen Chin
Assistant Examiner—Hai H. Phan
Attorney, Agent, or Firm—Helfgott & Karas, P.C.

[57] ABSTRACT

A synchronization control method for a synchronous digital hierarchy system includes the steps of: at a first selecting unit, selecting a given number of timing sources, from among a plurality of first timing sources within a main shelf, in accordance with user setting data, and outputting the given number of the selected timing sources; at a first quality data generating unit, outputting quality data of one or more of the selected timing sources when the one or more of the selected timing sources have no quality data; at a second selecting unit, selecting one or more timing sources from among a plurality of second timing sources within a slave shelf when any timing sources set by the user setting data are included in the second timing sources within the slave shelf, and transmitting the selected one or more timing sources to the main shelf; at a second quality data generating unit, outputting the quality data of the one or more timing sources supplied from the second selecting unit, and transmitting the quality data to the main shelf; and at a first quality selecting unit, selecting a timing source having the highest quality value among the quality data from the first and second quality data generating units, from among the given number of the timing sources, and outputting the selected timing source to the main shelf as equipment clock, and transmitting the equipment clock to the slave shelf.

10 Claims, 7 Drawing Sheets

METHOD OF TRANSMITTING SYNC CLOCK AND SYNC DATA BETWEEN SHELVES OF A SYNCHRONOUS DIGITAL HIERARCHY SYSTEM

This is a continuation of application Ser. No. 08/210,236, filed Mar. 17, 1994 now abandoned.

BACKGROUND OF THE INVENTION

(1) Field of the Invention

The present invention relates to a method of transmitting sync clock and sync data between shelves of a synchronous digital hierarchy system, the system including a main shelf containing main equipment and a slave shelf containing slave equipment.

(2) Description of the Prior Art

In order to obtain a diverse-function, high-performance synchronous digital hierarchy (SDH) system with a small size and low cost, an SDH system including a plurality of shelves has been proposed. The proposed SDH system includes a main shelf containing main equipment (for example, a high-speed unit) and a slave shelf containing slave equipment (for example, a plurality of low-speed units). The slave shelf is also called the tributary shelf. Within the slave shelf, several low-speed units of different kinds are supported as a single module. The main shelf of the high-speed unit and the slave shelf of the low-speed units are interconnected by cables, and the slave shelf including the low-speed units acts as the tributary module of the main shelf.

In order to allow the proposed SDH system having different shelves to operate as a single system in relation to an external system, it is necessary to synchronize the component units of the SDH system by using the same timing source in the shelves of the SDH system.

FIG.7 shows the construction of a typical synchronous digital hierarchy (SDH) system. The SDH system in FIG.7 is comprised of a high-speed (HS) unit 101, and a plurality of low-speed (LS) units 102 through 105 connected to the HS unit 101. The HS unit 101 is accommodated in a master shelf, and the LS units 102 through 105 are respectively accommodated in slave shelves.

A synchronization control method for an SDH network by which a timing source is selected from among a plurality of timing sources within the SDH network is as follows. The selected timing source is transmitted between the shelves of the SDH system in FIG. 7 to synchronize the component units of the SDH system.

(1) Some timing sources needed to synchronize the component units of the SDH system are preset by the user. For example, three timing sources are selected by the user as the timing sources needed to synchronize the component units.

(2) Priority data is assigned to each of the selected timing sources by the user. For example, one of three distinct priority values (the highest priority value "P1", the middle priority value "P2", and the lowest priority value "P3") is assigned by the user to each of the selected three timing sources.

(3) Predetermined quality data read from the Sync Status Message Half-Byte (SSMB) relating to the selected timing sources are compared with each other by the main unit of the SDH system, and a timing source having the highest quality value is selected as an equipment clock by the main unit. As defined in the recommendation CCITT G.708, the quality level of the respective timing sources is predetermined as one of a set of distinct quality values. The SSMB is 4-bit sync data indicating the synchronization timing source quality, and it is transmitted to and from a transmission line as the S1 bits of the Multiplex Section Overhead of the Synchronous Transport Module (STM-N) frame.

FIG.8 shows the switching of timing sources within a shelf of an SDH system. In FIG. 8, a list selecting unit 201 selects a number of timing sources 202 from among a plurality of timing sources within the SDH system in accordance with the user selection. The selected timing sources 202 (for example, three timing sources) are transferred to a quality/priority selecting unit 203. The quality/priority selecting unit 203 compares the quality and priority values of the timing sources 202 with each other, and selects a timing source having the highest quality value and the highest priority value from among the timing sources 202. The selected timing source is transmitted from the quality/priority selecting unit 203 as the equipment clock of the shelf, and it is transmitted to a different shelf as the output clock synchronous to the equipment clock.

When the Synchronous Transport Module (STM-N) transmission signals are used as the synchronization timing sources within the shelf, the timing source quality value is given by the SSMB data. However, if the external input timing source signals or the tributary input timing source signals, other than the STM-N transmission signals, are used as the synchronization timing sources within the shelf, the user has to preset the synchronization timing source quality values of the timing sources in a certain manner. For example, a quality value "Quality-2" is preset to the external input timing source, and a quality value "Quality-3" is preset to the tributary input timing source.

In addition, it is necessary to stop outputting of the equipment clock to the external unit when the quality value of the selected timing source is lower than a reference quality value set by the user.

As described above, the selection and switching of the timing sources require a complicated control operation. When the SDH system is made up of a single shelf, the synchronization control is simply carried out. However, when the SDH system is comprised of a plurality of shelves, it is difficult to accomplish the synchronization control. For example, a relatively long processing time is needed for the switching of timing sources, and the number of cables for interconnecting the shelves of the system is increased. Because of the difficulty mentioned above, there is no conventional SDH system in which the sync data and the sync clock are transmitted between the shelves of the system to synchronize the component units of the system.

In addition, it may be necessary that a large SDH system has a tributary shelf connected to a network. In the SDH system including the main shelf and the slave shelf, it is necessary to transmit sync data and sync clock between the shelves of the system in order to mutually synchronize the component units of the shelves. However, there is no synchronization control method suitable for such a system which is currently available.

SUMMARY OF THE INVENTION

Accordingly, it is a general object of the present invention to provide a novel and useful synchronization control method for a synchronous digital hierarchy system in which the above described problems are eliminated.

Another, more specific object of the present invention is to provide a synchronization control method which can efficiently synchronize the component units of a synchronous digital hierarchy system by transmitting sync data and sync clock between different shelves of the system including a main shelf containing main equipment and a slave shelf containing slave equipment.

These and other objects of the present invention are achieved by a synchronization control method for a synchronous digital hierarchy system which method includes the steps of: at a first selecting unit, selecting a given number of timing sources, from among a plurality of first timing sources within the main shelf, in accordance with user setting data, and outputting the given number of the selected timing sources; at a first quality data generating unit, outputting quality data of one or more of the selected timing sources supplied from the first selecting unit when the one or more of the selected timing sources have no quality data; at a second selecting unit, selecting one or more timing sources from among a plurality of second timing sources within the slave shelf when any timing sources set by the user setting data are included in the second timing sources within the slave shelf, and transmitting the selected one or more timing sources from the slave shelf to the main shelf; at a second quality data generating unit, outputting the respective quality data of the one or more timing sources supplied from the second selecting unit, and transmitting the quality data from the slave shelf to the main shelf; and, at a first quality selecting unit, selecting a timing source having the highest quality value among the quality data from the first and second quality data generating units, from among the given number of the selected timing sources from the first selecting unit, and outputting the thus selected timing source to the main shelf as an equipment clock, and transmitting the equipment clock from the main shelf to the slave shelf.

These and other objects of the present invention are also achieved by a synchronization control method for a synchronous digital hierarchy system which method includes the steps of: at a slave shelf list selecting unit, selecting one or more timing sources, from among a plurality of second timing sources within the slave shelf, in accordance with user setting data, and transmitting the selected one or more timing sources from the slave shelf to the main shelf; at a first main shelf list selecting unit, selecting a given number of timing sources, from among a plurality of first timing sources within the main shelf and from among the selected one or more timing sources supplied from the slave shelf list selecting unit, in accordance with the user setting data, and outputting the given number of the selected timing sources; at a slave shelf quality data selector, selecting one or more pieces of quality data of the selected one or more timing sources selected at the slave shelf list selecting unit, from a plurality of pieces of quality data of the second timing sources within the slave shelf, and transmitting the selected one or more pieces of the quality data from the slave shelf to the main shelf; at a first main shelf data selector, selecting a given number of pieces of quality data of the selected timing sources selected at the first main shelf list selecting unit, from among a plurality of pieces of quality data within the main shelf and from among the selected one or more pieces of the quality data supplied from the slave shelf quality data selector, and outputting the given number of pieces of the quality data; at a main shelf quality data selecting unit, selecting the highest quality value among the given number of pieces of the quality data from the first main shelf data selector, and outputting the highest quality value; at a second main shelf list selecting unit, selecting a timing source having the highest quality value from among the given number of the selected timing sources supplied from the first main shelf list selecting unit, and outputting the thus selected timing source to the main shelf as an equipment clock, and transmitting the equipment clock of the main shelf to the slave shelf; and, at a second main shelf data selector, selecting a piece of quality data of the thus selected timing source selected at the second main shelf list selecting unit, and transmitting the selected piece of the quality data to a transmission line.

The synchronization control method according to the present invention makes it possible to transmit the sync data and the sync clock between different shelves of a synchronous digital hierarchy system including a main shelf containing main equipment and a slave shelf containing slave equipment. Thus, according to the present invention, it is possible to efficiently synchronize the component units of different shelves by transmitting the sync data and sync clock between the shelves of the system when the SDH system is of a large size including many slave units in the slave shelves.

BRIEF DESCRIPTION OF THE DRAWINGS

The above and other objects, features and advantages of the present invention will be more apparent from the following detailed description when read in conjunction with the accompanying drawings in which.

DESCRIPTION OF THE PREFERRED EMBODIMENTS

Figure 1:
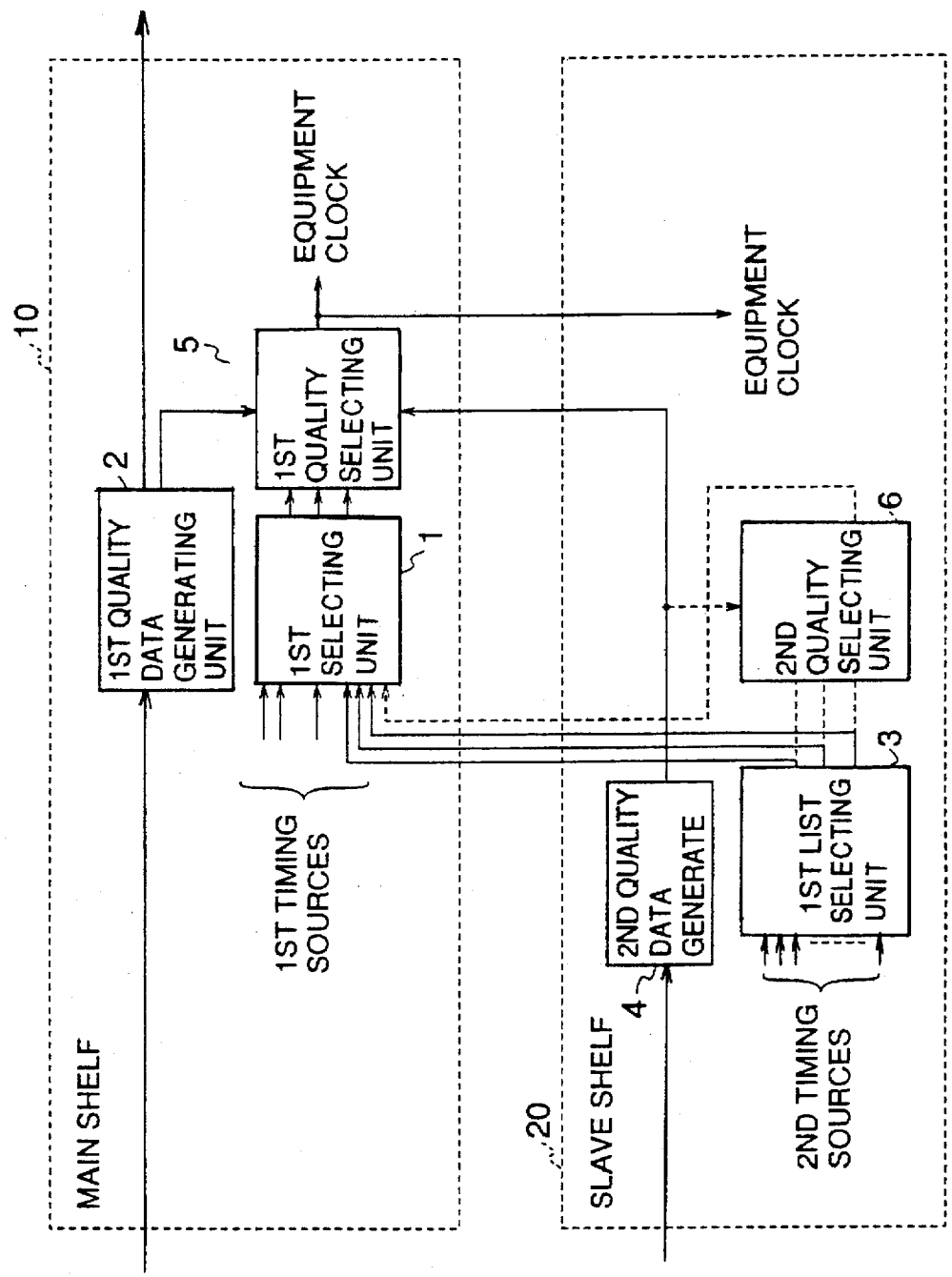
FIG. 1 is a block diagram for explaining a synchronization control method according to the present invention.

A description will now be given, with reference to FIG. 1, of a synchronization control method according to the present invention. In FIG. 1, a synchronous digital hierarchy (SDH) system includes a main shelf 10 containing main equipment and a slave shelf 20 containing slave equipment. The main shelf 10 comprises a first selecting unit 1, a first quality data generating unit 2, and a first quality selecting unit 5. The slave shelf 20 comprises a second selecting unit 3, a second quality data generating unit 4, and a second quality selecting unit 6.

In the synchronization control method according to the present invention, at the first selecting unit 1 of the main shelf 10, a given number of timing sources is selected from among a plurality of first timing sources within the main shelf 10 in accordance with user setting data within the main shelf when the timing sources indicated by the user setting data are included in the first timing sources, and the selected timing sources are provided to the first quality selecting unit 5.

At the first quality data generating unit 2 of the main shelf 10, quality data of one or more of the selected timing sources supplied from the first selecting unit 1 is generated when the one or more of the selected timing sources have no quality data.

At the second selecting unit 3 of the slave shelf 20, one or more timing sources from among a plurality of second timing sources within the slave shelf are selected when any timing sources set by the user setting data are included in the second timing sources within the slave shelf 20, and the selected one or more timing sources from the slave shelf are transmitted to the main shelf 10.

At the second quality data generating unit 4 of the slave shelf 20, the respective quality data of the selected one or more timing sources supplied from the second selecting unit is provided in accordance with the user setting data, and the quality data of said selected one or more timing sources is transmitted from the slave shelf to the main shelf.

At the first quality selecting unit 5 of the main shelf 10, a timing source having the highest quality value among the quality data from the first and second quality data generating units is selected from among the given number of the selected timing sources supplied from the first selecting unit 1, and the thus selected timing source is provided to the main shelf as the equipment clock, and the equipment clock of the main shelf 10 is transmitted to the slave shelf 20.

Figure 2:
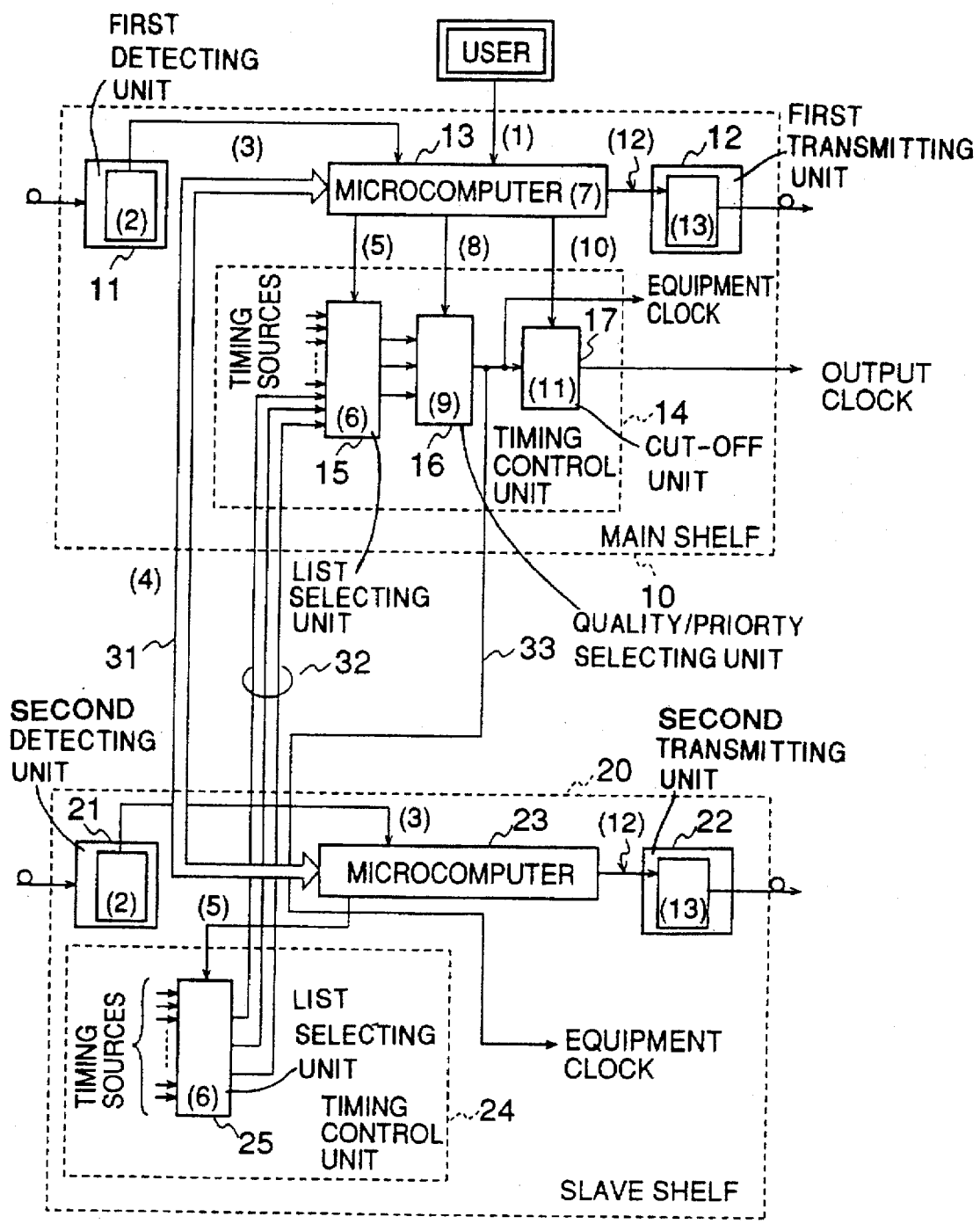
FIG. 2 is a block diagram for explaining the first embodiment of the present invention.
Figure 7:
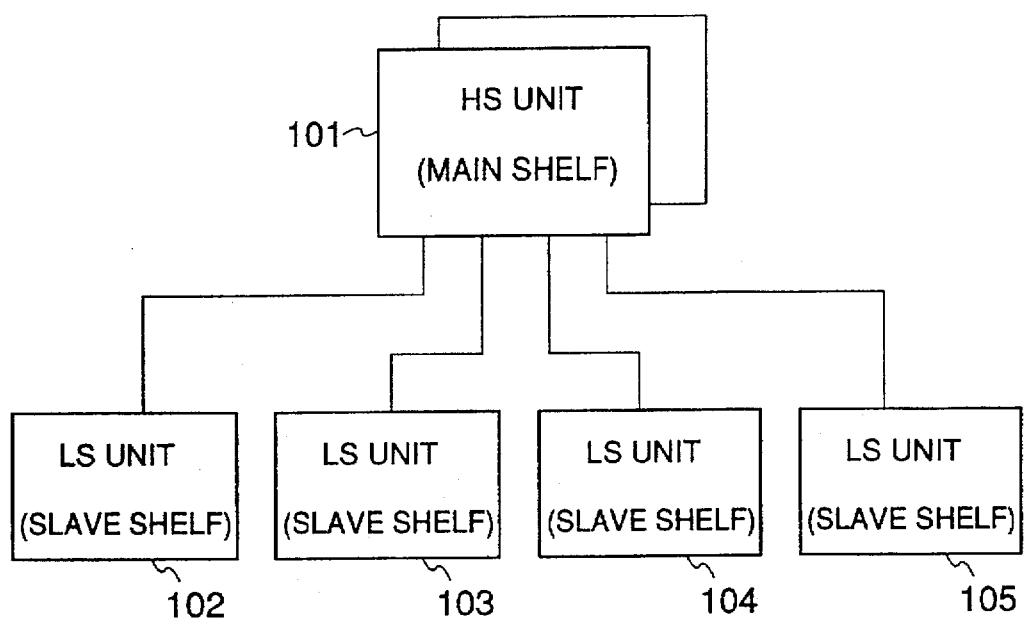
FIG. 7 is a block diagram showing the structure of a typical synchronous digital hierarchy system.
Figure 8:
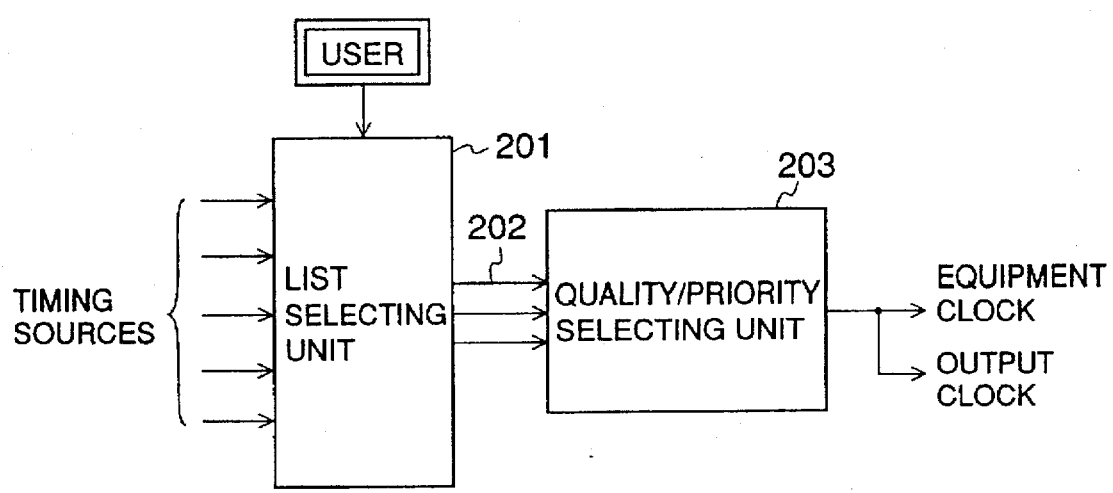
FIG. 8 is a block diagram for explaining the switching of timing sources within a synchronous digital hierarchy system.

Next, a description will be given of the first embodiment of the present invention. FIG. 2 shows a synchronous digital hierarchy system to which the first embodiment of the present invention is applied. Actually, the synchronous digital hierarchy system is made up of a main shelf and a plurality of slave shelves connected to the main shelf, as shown in FIG. 7. For the sake of convenience, the synchronous digital hierarchy system including a main shelf 10 and a slave shelf 20 only is shown in FIG. 2.

In the first embodiment shown in FIG. 2, the main shelf 10 and the slave shelf 20 are interconnected by three connecting cables. The number of the connecting cables is equal to the maximum number of timing sources that can be set by the user. FIG. 2 shows the manner how the detection of the SSMB, the selection of the timing sources, and the stopping of the output of the equipment clock are carried out according to the first embodiment.

In the main shelf 10, a first detecting unit 11 detects the SSMB data from the S1 bits of the Multiplex Section Overhead of the STM-N frame on an input optical transmission line. A first transmitting unit 12 transmits the SSMB to an output optical transmission line. A microcomputer 13 controls synchronization in the main shelf 10.

A timing control unit 14 carries out the selection of an equipment clock from a plurality of timing sources. In the timing control unit 14, a list selecting unit 15 selects three timing sources from among the plurality of the timing sources by software functions. A quality/priority selecting unit 16 selects a timing source, as the equipment clock, from among the selected three timing sources of the list selecting unit 15 in accordance with the quality/priority values set by the user. A cut-off unit 17 stops the outputting of the equipment clock from the quality/priority selecting unit 16 to an external unit.

In the slave shelf 20, a second detecting unit 21 detects the SSMB data from the S1 bits of the Multiplex Section Overhead of the STM-N frame on the input optical transmission line. A second transmitting unit 22 transmits the SSMB to an output optical transmission line. A microcomputer 23 controls synchronization in the slave shelf 20. A timing control unit 24 carries out the selection of timing sources. In the timing control unit 24, a list selecting unit 25 selects three timing sources from among a plurality of timing sources by software functions.

In FIG. 2, the microcomputer 13 of the main shelf 10 and the microcomputer 23 of the slave shelf 20 are interconnected by a bus 31. Connecting cables 32 by which the main shelf 10 and the slave shelf 20 are interconnected are signal paths through which the clock signals of the selected timing sources from the list selecting unit 25 are transferred to the list selecting unit 15. A line 33 is a signal path through which an equipment clock from the main shelf 10 is transferred to the slave shelf 20. Not only the plurality of the timing sources within the main shelf 10 but also the three timing sources from the slave shelf 20 via the cables 32 are connected to the list selecting unit 15.

Next, a description will be given of the synchronization control procedures performed according to the first embodiment with reference to FIG. 2. The respective synchronization control procedures of the first embodiment are designated by the reference numerals in parentheses in FIG. 2, and each description of the procedures which are designated by the same reference numerals as shown in FIG. 2 will follow:

(1) The user selects specific timing sources in the microcomputer 13. When the setting of the quality data is needed, the user sets the respective quality values of the user-selected timing sources in the microcomputer 13. Also, the user sets the respective priority values of the user-selected timing sources in the microcomputer 13. Specific ports of the list selecting unit 15, for example, "P1" (the highest priority), "P2" (the second highest priority), and "P3" (the third highest priority), are specified for the user-selected timing sources in accordance with the priority values set by the user. Also, the user sets a reference quality value in the microcomputer 13. The microcomputer 13 has the cut-off unit 17 stop outputting the equipment clock to an external unit when the quality value of the finally selected timing source is lower than the reference quality value set by the user. Hereinafter, all the setting data which was set by the user in the microcomputer 13 at this step (1) is referred to as the user setting data.

(2) The first and second detecting units 11 and 21 detect the SSMB values from the S1 bits of the Multiplex Section Overhead of the STM-N frames on the input optical transmission lines respectively.

(3) The first and second detecting units 11 and 21 transfer the detected SSMB values (the timing source quality values) to the microcomputers 13 and 23 respectively.

(4) When a user-selected timing source is included in those supplied from the slave shelf 20, the microcomputer 13 of the main shelf transmits the user setting data of that timing source to the microcomputer 23 via the bus 31. When a user-selected timing source is included in the slave shelf 20, the microcomputer 23 of the slave shelf transmits the detected SSMB data of that timing source to the microcomputer 13 via the bus 31.

(5) The microcomputers 13 and 23 transfer the user setting data of the selected timing sources to the list selecting units 15 and 25 respectively.

(6) The list selecting unit 25 of the slave shelf selects user-selected timing sources from among the plurality of the timing sources in accordance with the user selection, and transfers the user-selected timing sources to the list selecting unit 15 via the cables 32. The list selecting unit 15 of the main shelf selects three timing sources from among the plurality of timing sources including the user-selected timing sources from the slave shelf 20, in accordance with the user selection. The list selecting unit 15 transfers the three user-selected timing sources to its ports "P1" through "P3" in accordance with the priority values respectively.

(7) The microcomputer 13 of the main shelf compares the quality values of the user-selected three timing sources with each other, and selects a timing source with the highest quality value from among the three timing sources output from the list selecting unit 15. If two or three of the user-selected timing sources have the same quality value, the microcomputer 13 selects a timing source with the higher priority value. Also, the microcomputer 13 detects whether or not the quality value of the currently selected timing source, or the equipment clock, is lower than the reference quality value set by the user.

(8) The microcomputer 13 transfers the result of the comparison at step (7) to the quality/priority selecting unit 16. The result of the comparison indicates which is the user-selected timing source with the highest quality value among those of the user-selected timing sources.

(9) The quality/priority selecting unit 16 selects one of the user-selected timing sources in accordance with the result of the comparison by the microcomputer 13. The quality/priority selecting unit 16 outputs the finally selected timing source as the equipment clock of the main shelf 10. Also, the quality/priority selecting unit 16 transmits the equipment clock to the slave shelf 20 via the line 33.

(10) If the quality value of the finally selected timing source is detected as being lower than the reference quality value, the microcomputer 13 transfers the result of the detection to the cut-off unit 17.

(11) The cut-off unit 17 stops the equipment clock from being output from the quality/priority selecting unit 16 to the external unit, in accordance with the result of the detection by the microcomputer 13.

(12) The microcomputers 13 and 23 transfer the quality value of the current timing source to the first and second transmitting units 12 and 22 respectively. Thus, the transmitting units 13 and 23 are notified of the quality data of the timing source currently used as the equipment clock.

(13) The first and second transmitting units 12 and 22 transmit the quality data of the microcomputers 13 and 23 as the S1 bits of the Multiplex Section Overhead of the STM-N frames respectively. Thus, the first and second transmitting units 12 and 22 transmit the SSMB data to the output optical transmission lines respectively.

Figure 3:
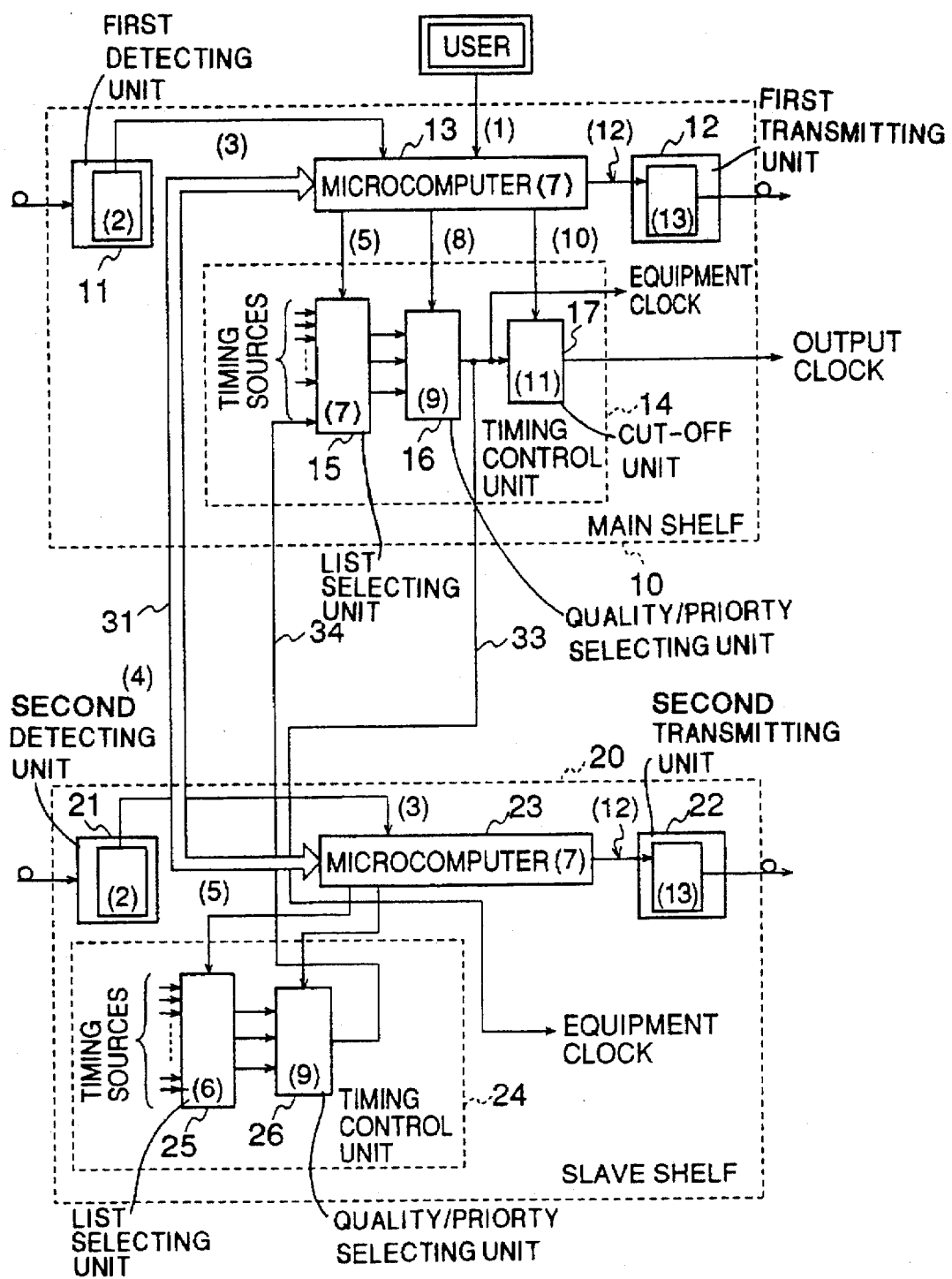
FIG. 3 is a block diagram for explaining the second embodiment of the present invention.

Next, a description will be given of the second embodiment of the present invention. FIG. 3 shows a synchronous digital hierarchy system of the second embodiment of the present invention. In FIG. 3, the units which are the same as corresponding units in FIG. 2 are designated by the same reference numerals, and a description thereof will be omitted.

In the slave shelf 20 shown in FIG. 3, the timing control unit 24 includes a quality/priority selecting unit 26 and the list selecting unit 25. The list selecting unit 25 selects user-selected timing sources from among a plurality of timing sources in accordance with the user selection. The quality/priority selecting unit 26 selects a timing source from among the selected timing sources of the list selecting unit 25 in accordance with the quality/priority values. The quality/priority selecting unit 26 is connected to the list selecting unit 15 of the main shelf via a cable 34, and transfers the selected timing source to the list selecting unit 15 via the cable 34.

The synchronization control procedures performed according to the second embodiment are designated by the reference numerals in parentheses in FIG. 3, and each description of the procedures designated by the same reference numerals as shown in FIG. 3 will follow:

(1), (2), (3) The procedures, which are the same as the steps (1) through (3) of the first embodiment described above, are performed.

(4) When a user-selected timing source is included in those supplied from the slave shelf 20, the microcomputer 13 of the main shelf transmits the use=setting data of that timing source to the microcomputer 23 via the bus 31.

(5) The microcomputers 13 and 23 transfer the user setting data of the user-selected timing sources to the list selecting units 15 and 25 respectively.

(6) The list selecting unit 25 of the slave shelf selects three user-selected timing sources from among the plurality of the timing sources in accordance with the user selection, and transfers the three user-selected timing sources to the quality/priority selecting unit 26.

(7) The microcomputer 23 of the slave shelf compares the quality values of the three user-selected timing sources with each other, and selects a single timing source with the highest quality value from among the three timing sources output from the list selecting unit 25. The microcomputer 23 transfers the highest quality value of the selected timing source to the microcomputer 13 of main shelf via the bus 31, and directs the single timing source to the input of the list selecting unit 15. The list selecting unit 15 of the main shelf selects three timing sources from among the plurality of timing sources including the single user-selected timing source from the slave shelf 20. The list selecting unit 15 transfers the user-selected three timing sources to its ports "P1" through "P3" in accordance with the user setting data, respectively.

(8) The microcomputer 13 of the main shelf transfers the result of the comparison to the quality/priority selecting unit 16, and compares the quality values of the three user-selected timing sources with each other, and selects a timing source with the highest quality value from the output of the list selecting unit (9) The quality/priority selecting unit 16 outputs the finally selected timing source as the equipment clock of the main shelf 10. Also, the quality/priority selecting unit 16 transmits the equipment clock to the slave shelf 20 via the line 33.

The microcomputer 13 detects whether or not the quality value of the currently selected timing source, or the equipment clock, is lower than the reference quality value set by the user.

(10) If the quality value of the finally selected timing source is detected as being lower than the reference quality value, the microcomputer 13 transfers the result of the detection to the cut-off unit 17.

(11) The cut-off unit 17 stops the equipment clock from being output from the quality/priority selecting unit 16 to an external unit, in accordance with the result of the detection by the microcomputer 13.

(12) The microcomputers 13 and 23 transfer the quality value of the current timing source to the first and second transmitting units 12 and 22, respectively, to notify the transmitting units of the quality data of the timing source currently used as the equipment clock.

(13) The first and second transmitting units 12 and 22 transmit the quality data of the microcomputers 13 and 23 as the S1 bits of the Multiplex Section Overhead of the STM-N frames respectively. Thus, the first and second transmitting units 12 and 22 transmit the SSMB data to the output optical transmission lines respectively.

In summary, in the second embodiment in FIG. 3, the timing source with the highest quality value is selected within the slave shelf, and the selected timing source is transferred to the main shelf via a single cable. It is not necessary to use two or more timing source cables through which clock signals of the user-selected timing sources are transferred from a single slave shelf to the main shelf.

However, in the first embodiment in FIG. 2, three timing source cables are needed to transfer the user-selected timing sources from a single slave shelf to the main shelf. In the case of the SDH system including four slave shelves connected to the main shelf as shown in FIG. 7, a total of twelve timing source cables are needed to transfer the user-selected timing sources from the respective slave shelves to the main shelf. Thus, the first embodiment described above has a problem in that the larger the number of slave shelves is, the much larger the number of timing source cables required by the SDH system becomes.

Thus, in the second embodiment in FIG. 3, it is possible to considerably reduce the number of the required timing source cables when the SDH system has many slave shelves connected to the main shelf.

Figure 4:
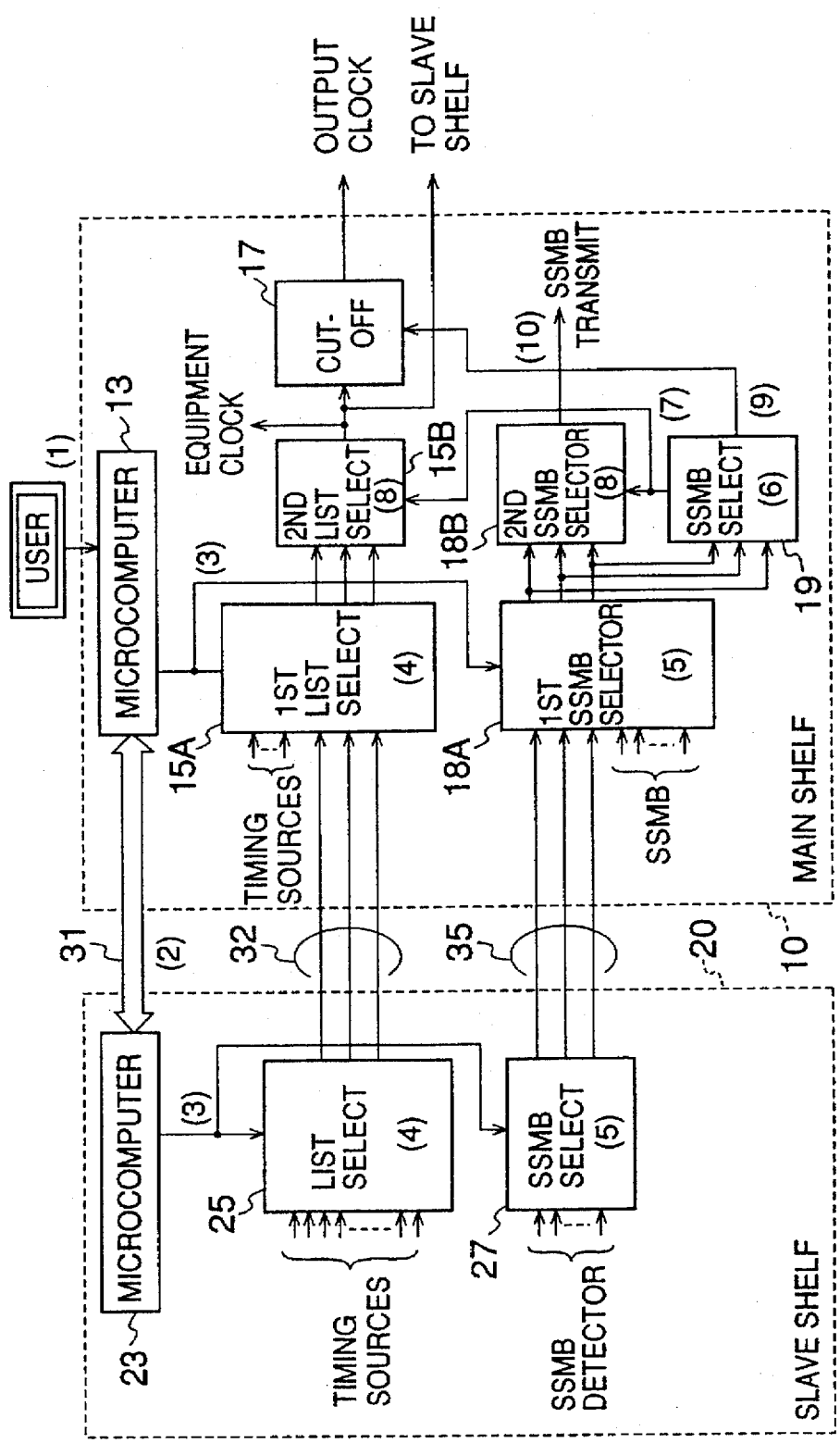
FIG. 4 is a block diagram for explaining the third embodiment of the present invention.

Next, a description will be given of the third embodiment of the present invention. FIG. 4 shows a synchronous digital hierarchy system of the third embodiment. In FIG. 4, the units which are the same as corresponding units in FIG. 2 are designated by the same reference numerals, and a description thereof will be omitted. The detecting units 11 and 21 as well as the transmitting units 12 and 22 of the first embodiment in FIG. 2 are omitted in FIG. 4.

The third embodiment shown in FIG. 4 is directed to shortening the processing time by performing the comparison of timing source quality values, the switching of timing sources, and the stopping of the output of the equipment clock by using hardware functions instead of the microcomputer.

The main shelf 10 of the third embodiment in FIG. 4 includes the microcomputer 13, first and second list selecting units 15A and 15B, the cut-off unit 17, first and second SSMB selectors 18A and 18B, and an SSMB selecting unit 19. The slave shelf 20 includes the microcomputer 23, the list selecting unit 25, and an SSMB selector 27. The first SSMB selector 18A of the main shelf and the SSMB selector 27 of the slave shelf are interconnected by three SSMB cables 35, and the SSMB from the SSMB selector 27 are transferred to the first SSMB selector 18A via the SSMB cables 35.

Next, the synchronization control procedures performed according to the third embodiment are designated by the reference numerals in parentheses in FIG. 4, and each description of the procedures designated by the same reference numerals as shown in FIG. 4 will follow:

(1) The user sets specific timing sources in the microcomputer 13 of the main shelf. When the setting of the quality data is needed, the user sets the respective quality values of the user-selected timing sources in the microcomputer 13. Also, the user sets the respective priority values of the user-selected timing sources in the microcomputer 13. Also, the user sets a reference quality value in the microcomputer 13.

(2) When a user-selected timing source is included in those supplied from the slave shelf, the microcomputer 13 of the main shelf transmits the user setting data of that timing source to the microcomputer 23 of the slave shelf via the bus 31.

(3) The microcomputer 13 transfers the user setting data of the user-selected timing sources to the first list selecting unit 15A and the first SSMB selector 18A respectively. The microcomputer 23 of the slave shelf transfers the user setting data of the user-selected timing sources to the list selecting unit 25 and the SSMB selector 27 respectively.

(4) The list selecting unit 25 of the slave shelf selects user-selected timing sources from among a plurality of timing sources in accordance with the user setting data from the microcomputer 23, and transmits the user-selected timing sources to the first list selecting unit 15A via the cables 32. The first list selecting unit 15A selects three timing sources from among the plurality of timing sources, including the user-selected timing sources from the slave shelf, in accordance with the user setting data from the microcomputer 13. The first list selecting unit 15A transfers the three user-selected timing sources to its ports "P1" through "P3" in accordance with the priority values respectively.

(5) The SSMB selector 27 selects the SSMB relating to the user-selected timing sources from among a plurality of SSMB in accordance with the user setting data, and transmits the selected SSMB to the first SSMB selector 18A via the cables 35. The first SSMB selector 18A selects the SSMB relating to the three user-selected timing sources from among a plurality of SSMB including the SSMB from the SSMB selector 27, in accordance with the user setting data from the microcomputer 13. When a user-selected timing source has no SSMB data, the quality value set by the user is assigned to that timing source.

(6) The SSMB selecting unit 19 selects the SSMB having the highest quality value among the three SSMB supplied from the first SSMB selector 18A. When two or three of the SSMB from the first SSMB selector 18A have the same quality value, the SSMB corresponding to the timing source with the higher priority value is selected. The SSMB selecting unit 19 detects whether or not the quality value of the currently selected timing source, or the equipment clock, is lower than the reference quality value set by the user.

(7) The SSMB selecting unit 19 transfers the highest quality value (the SSMB) of the selected timing source to the second SSMB selector 18B and the second list selecting unit 15B respectively.

(8) The second list selecting unit 15B selects a timing source with the highest quality value from among the three user-selected timing sources supplied from the first list selecting unit 15A. The second list selecting unit 15B transmits the selected timing source as the equipment clock. The second SSMB selector 18B selects the SSMB having the highest quality value from among the three SSMB supplied from the first SSMB selector 18A.

(9) The cut-off unit 17 stops the outputting of the equipment clock from the second list selecting unit 15B to the external unit when the quality value (supplied from the SSMB selecting unit 19) of the currently selected timing source is lower than the reference quality value.

(10) The SSMB selecting unit 18B transfers the SSMB of the currently selected timing source to the transmitting unit (not shown in FIG. 4) so that the SSMB is transmitted to the output optical transmission line.

Figure 5:
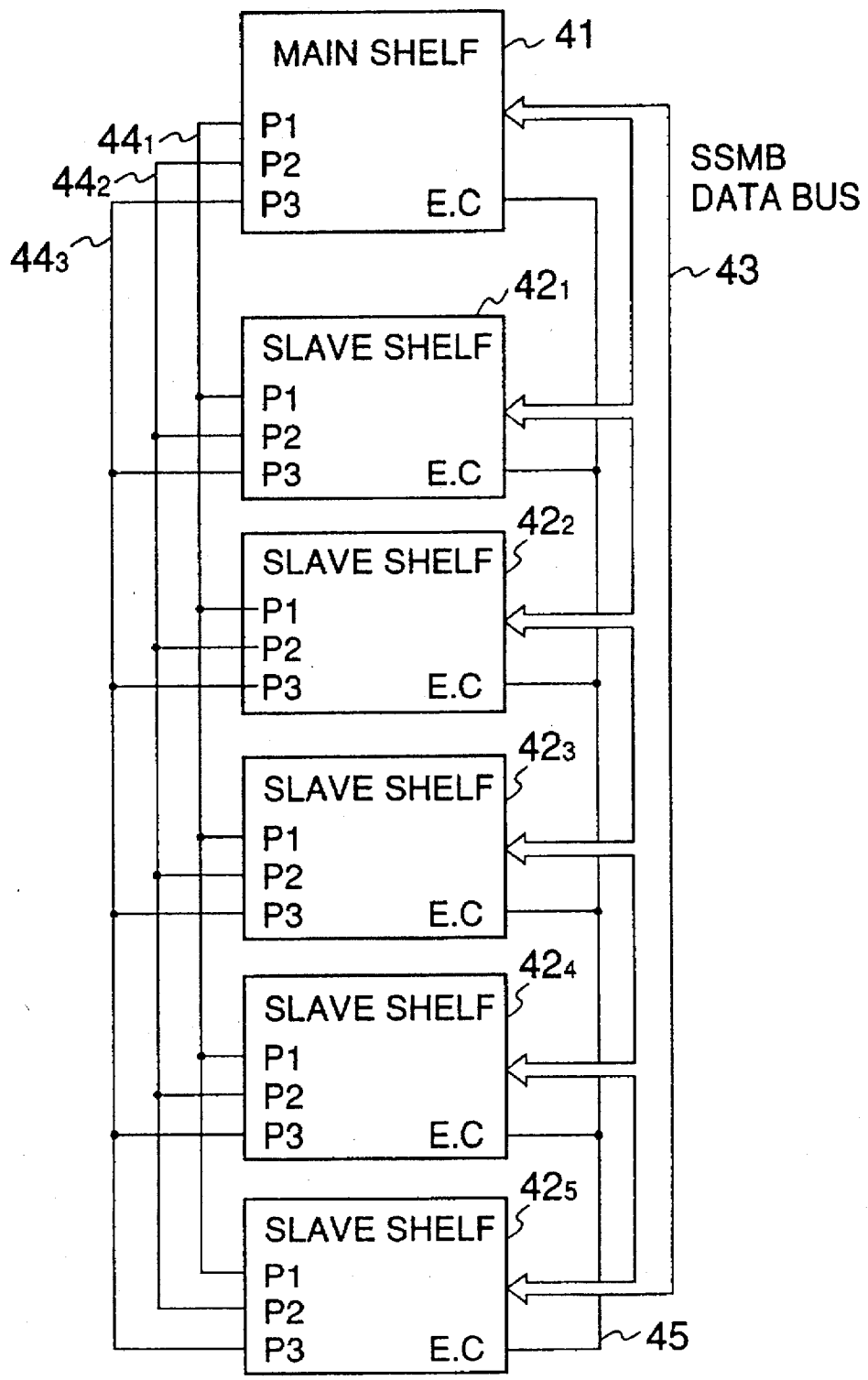
FIG. 5 is a block diagram for explaining the fourth embodiment of the present invention.

Next, a description will be given of the fourth embodiment of the present invention. FIG. 5 shows a synchronous digital hierarchy (SDH) system of the fourth embodiment. In the SDH system of this embodiment, the SSMB and the timing sources are transmitted on a set of buses between the main shelf and the slave shelves. In the fourth embodiment in FIG. 5, the component units contained in the main shelf and in the slave shelves are the same as corresponding units in the first through third embodiments described above, and are omitted in FIG. 5, for the sake of convenience.

The SDH system of the fourth embodiment shown in FIG. 5 comprises a main shelf 41 and a plurality of slave shelves $42_1$ through $42_5$. The main shelf 41 and the respective slave shelves $42_1$ through $42_5$ are interconnected by an SSMB data bus 43, three timing source common lines $44_1$ through $44_3$, and a common line 45.

As described above, the number of timing sources selected by the user is a given one, and the priority values assigned by the user are preset to the related timing sources. Thus, in the fourth embodiment, the SSMB data bus 43 is provided between the shelves in order to transmit the SSMB on the SSMB data bus 43 between the shelves in common. The timing source common lines $44_1$ through $44_3$ are connected to the ports "P1" through "P3" of each respective list selecting unit of the main shelf 41 and the slave shelves $42_1$ through $42_5$ for transmitting, in common, the timing sources on the common lines $44_1$ through $44_3$ between the shelves in accordance with their priority values. The common line 45 is connected to the shelves in parallel for transmitting the equipment clock (EC) from the main shelf 41 to the slave shelves $42_1$ through $42_5$ in common. The comparison of timing source quality values (the SSMB), the switching of timing sources, and the stopping of the output of the equipment clock are performed within the main shelf 41.

In addition, as an alternative to the above described embodiments, central processing units (CPU) can be used instead of the microcomputers 13 and 23 of the main and slave shelves. The CPU units are individually provided on the main shelf and the slave shelves, and each CPU unit carries out only the tasks relating to the sync clock/sync data transmission, that is, the comparison of timing source quality values, the switching of timing sources, and the stopping of the output of the equipment clock. By using the above mentioned CPU units instead, it is possible to remarkably shorten the processing time needed for the sync clock and sync data transmission.

For example, in the first and second embodiments, the microcomputers 13 and 23 carry out not only the tasks but also the other tasks including the monitoring of the system components. When both the synchronization control tasks and the other tasks are performed at the same time, it takes a relatively long time to complete the synchronization control tasks. The microcomputers 13 and 23 in some cases may not complete the synchronization control tasks within a prescribed time period. Thus, if the synchronization control tasks must be finished within a prescribed time period, the processing time can be remarkably reduced by using the above mentioned CPU units instead of the microcomputers 13 and 23.

Figure 6:
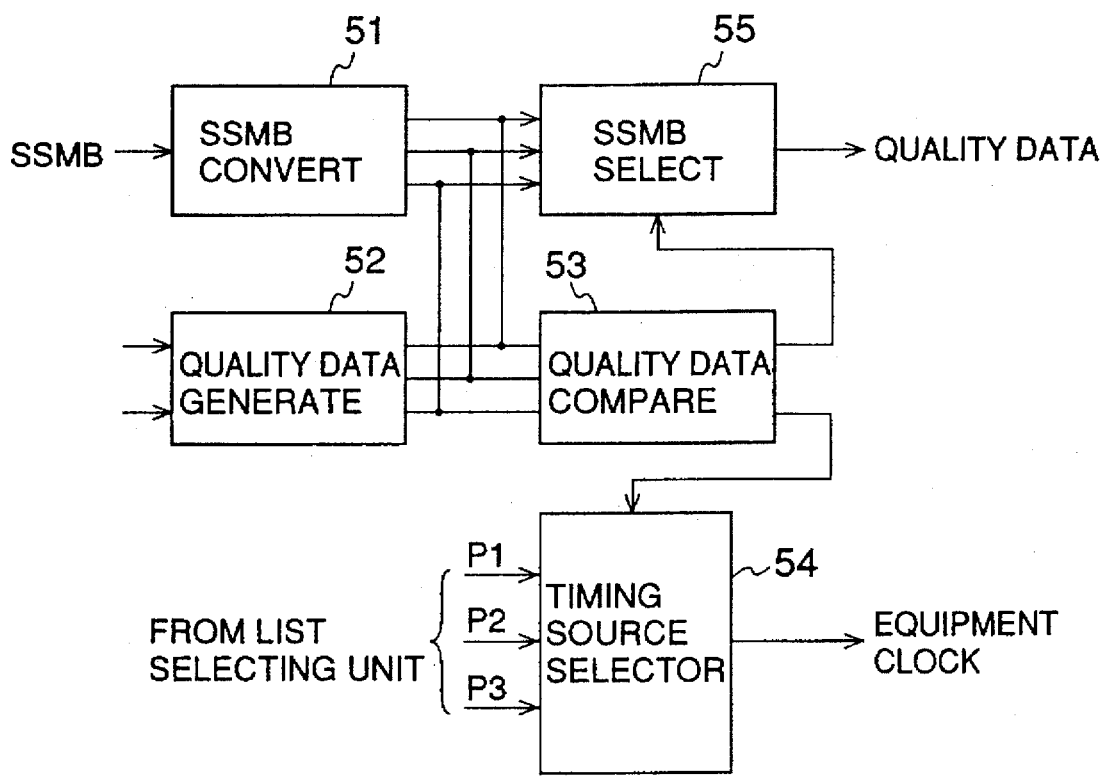
FIG. 6 is a block diagram showing a quality/priority selection unit according to the present invention.

FIG. 6 shows a quality/priority selecting unit according to the present invention. The quality/priority selecting unit in FIG. 6 can be applied to the quality/priority selecting unit 16 of the first and second embodiments in FIGS. 2 and 3.

In the quality/priority selecting unit shown in FIG. 6, an SSMB converting unit 51 converts the SSMB, read from the S1 bits of the Multiplex Section Overhead of the STM-N frame on the input optical transmission line, into quality data, for each the respective timing source. Any of a set of distinct timing source quality values (for example, five distinct values "Quality-2" through "Quality-6") is represented by the quality data from the SSMB converting unit 51. A quality data generating unit 52 generates a set of quality data which are originally assigned to the timing sources in accordance with the user setting data.

A quality data comparing unit 53 compares the quality values of the SSMB converting unit 51 and the quality values of the quality data generating unit 52 with each other, and selects a timing source with the highest quality value among those quality values. The result of the comparison by the quality data comparing unit 53 is transferred to a timing source selector 54 and a quality data selecting unit 55 respectively.

In response to the result of the comparison by the quality data comparing unit 53, the timing source selector 54 selects a timing source with the highest quality value from among the three timing sources with the priority values "P1", "P2" and "P3" output from the list selecting unit (not shown in FIG. 6). The timing source selector 54 transfers the selected timing source with the highest quality value as the equipment clock. When two or three timing sources have the same quality value, the timing source selector 54 selects a timing source with the higher priority value.

Also, in response to the result of the comparison, the SSMB selecting unit 55 selects the quality data of the selected timing source, specified by the quality data comparing unit 53, from among the quality data output from the SSMB converting unit 51. The SSMB selecting unit 55 transfers the selected quality data to a different SSMB converting unit (not shown in FIG. 6). The quality data supplied from the SSMB selecting unit 55 is reversely converted by the different SSMB converting unit into the 4-bit SSMB, and this data is transferred to an SSMB transmitting unit (not shown in FIG. 6).

As described in the foregoing, the synchronization control method according to the present invention makes it possible to transmit the sync data (the SSMB) and the sync clock between different shelves of a synchronous digital hierarchy system including a main shelf containing main equipment and a slave shelf containing slave equipment. Thus, according to the present invention, it is possible to efficiently synchronize the component units of different shelves by transmitting the sync data and sync clock between the shelves of the system when the SDH system is of a large size including many slave units within the slave shelves.

Further, the present invention is not limited to the above described embodiments, and variations and modifications may be made without departing from the scope of the present invention.

What is claimed is:

1. A method of transmitting sync data and sync clock between shelves of a synchronous digital hierarchy system, the system including a main shelf containing main equipment and a slave shelf containing slave equipment, wherein user setting data indicating a plurality of timing sources and respective quality data of the timing sources is supplied to each of the main shelf and the slave shelf, said method comprising the steps of:

selecting the timing sources, from among a plurality of first timing sources within the main shelf, in accordance with the user setting data within the main shelf when the timing sources indicated by the user setting data are included in the first timing sources, and outputting the selected timing sources;

generating respective quality data of the selected timing sources in accordance with the user setting data within the main shelf;

selecting one or more timing sources from among a plurality of second timing sources within the slave shelf in accordance with the user setting data within the slave shelf when said one or more timing sources are indicated by said user setting data and included in the second timing sources within the slave shelf, and transmitting said selected one or more timing sources from the slave shelf to the main shelf;

generating respective quality data of said selected one or more timing sources within the slave shelf in accordance with said user setting data, and transmitting said respective quality data of said selected one or more timing sources from the slave shelf to the main shelf; and selecting a timing source having the highest quality value among the quality data generated within the main shelf and among the quality data transmitted from the slave shelf, said timing source having the highest quality value being selected from among the selected timing sources within the main shelf and among the selected one or more timing sources within the slave shelf, and outputting the selected timing source having the highest quality value as an equipment clock, and transmitting the equipment clock from the main shelf to the slave shelf.

2. A method according to claim 1, wherein said method further comprises the step of, at a second quality selecting unit, selecting only one timing source, from among said selected one or more timing sources from said second selecting unit, based on the respective quality data from said second quality data generating unit, and transmitting said selected only one timing source from the slave shelf to the main shelf via a cable.

3. A method according to claim 1, wherein said user setting data, supplied to each of the main shelf and the slave shelf, indicates respective priority values of the timing sources in addition to the respective quality values, and said method further comprises the step of, at said first quality selecting unit, selecting a timing source having a higher priority value among the respective priority values of the selected timing sources based on said user setting data within the main shelf when two or more quality values of said selected timing sources from said first and second quality data generating units are equal to each other.

4. A method according to claim 1, wherein said method further comprises the steps of:
at a main shelf transmitting unit, transmitting the quality value of the timing source selected by the first quality selecting unit, to a transmission line; and
at a slave shelf transmitting unit, transmitting the quality value of the timing source selected by the first quality selecting unit to a transmission line.

5. A method according to claim 1, wherein said method further comprises the steps of:
outputting the equipment clock from the main shelf to an external unit; and
stopping the output of the equipment clock to the external unit when the quality value of the selected timing source selected by the first quality selecting unit is lower than a reference quality value indicated by the user setting data.

6. A method according to claim 1, wherein said method further comprises the step of, at said first quality data generating unit, transferring one or more quality values of the selected timing sources to said first quality selecting unit when said one or more timing sources are indicated by the user setting data but not included in the first timing sources.

7. A method according to claim 1, wherein said system includes the main shelf containing the main equipment and a plurality of slave shelves each containing the slave equipment, and said method further comprises the steps of:
transmitting said equipment clock from the main shelf to the respective slave shelves via a common equipment clock line;
transmitting said selected one or more timing sources from each slave shelf to the main shelf via common timing source lines in accordance with the priority values of said selected one or more timing sources; and
transmitting said quality data from each slave shelf to the main shelf via a common quality data bus.

8. A method of transmitting sync data and sync clock between shelves of a synchronous digital hierarchy system, the system including a main shelf containing main equipment and a slave shelf containing slave equipment, wherein user setting data indicating a plurality of timing sources and respective quality data of the timing sources is supplied to each of the main shelf and the slave shelf, said method comprising the steps of:
at a slave shelf list selecting unit, selecting one or more timing sources, from among a plurality of second timing sources within the slave shelf, in accordance with the user setting data when said one or more timing sources are indicated by the user setting data but not included in the main shelf, and transmitting said selected one or more timing sources from the slave shelf to the main shelf;
at a first main shelf list selecting unit, selecting the plurality of timing sources, from among a plurality of first timing sources within the main shelf and said selected one or more timing sources supplied from said slave shelf list selecting unit, in accordance with the user setting data, and outputting said selected timing sources;
at a slave shelf quality data selector, selecting respective quality data of said selected one or more timing sources from said slave shelf list selecting unit, from among respective quality data of said second timing sources within the slave shelf, and transmitting said selected quality data from the slave shelf to the main shelf;
at a first main shelf data selector, selecting respective quality data of said selecting timing sources from said first main shelf list selecting unit, from among respective quality data of the first timing sources and said selected quality data from said slave shelf quality data selector, and outputting said selected quality data;
at a main shelf quality data selecting unit, selecting the highest quality value among said selected quality data from said first main shelf data selector, and outputting said highest quality value;
at a second main shelf list selecting unit, selecting a timing source having the highest quality value from among the selected timing sources from said first main shelf list selecting unit, and outputting the selected timing source having the highest quality value as an equipment clock, and transmitting the equipment clock from the main shelf to the slave shelf; and at a second main shelf data selector, selecting a piece of quality data of the selected timing source from said second main shelf list selecting unit, and transmitting said selected quality data to a transmission line.

9. A method according to claim 8, wherein said user setting data, supplied to each of the main shelf and the slave shelf, indicates respective priority values of the timing sources in addition to the respective quality values, and said method further comprises the step of, at said second main shelf list selecting unit, selecting a timing source having a higher priority value among the respective priority values of the selected timing sources based on said user setting data within the main shelf when two or more quality values of said selected timing sources from said first main shelf data selector are equal to each other.

10. A method according to claim 8, wherein said method further comprises the steps of outputting the equipment clock from the main shelf to an external unit; and stopping the output of the equipment clock to the external unit when the highest quality value of the timing source selected by said main shelf quality data selecting unit is lower than a reference quality value indicated by the user setting data.

* * * * *